(12) United States Patent
Somasandharam

(10) Patent No.: US 10,613,994 B2
(45) Date of Patent: Apr. 7, 2020

(54) METHODS AND APPARATUS TO ESTABLISH A CONNECTION BETWEEN A SUPPLICANT AND A SECURED NETWORK

(71) Applicant: Intel Corporation, Santa Clara, CA (US)

(72) Inventor: Prahbu Somasandharam, Bayan Lepas (MY)

(73) Assignee: INTEL CORPORATION, Santa Clara, CA (US)

( * ) Notice: Subject to any disclaimer, the term of this patent is extended or adjusted under 35 U.S.C. 154(b) by 302 days.

(21) Appl. No.: 15/473,009

(22) Filed: Mar. 29, 2017

(65) Prior Publication Data

US 2018/0288006 A1 Oct. 4, 2018

(51) Int. Cl.
| | |
|---|---|
| *G06F 12/14* | (2006.01) |
| *H04L 9/32* | (2006.01) |
| *G06F 1/30* | (2006.01) |
| *H04L 29/06* | (2006.01) |

(52) U.S. Cl.
CPC ............ *G06F 12/1408* (2013.01); *G06F 1/30* (2013.01); *H04L 9/321* (2013.01); *H04L 9/3234* (2013.01); *H04L 63/0884* (2013.01); *H04L 63/0892* (2013.01); *G06F 2212/1052* (2013.01)

(58) Field of Classification Search
CPC ........... H04L 63/02812; H04L 63/0272; H04L 9/321; H04L 9/3234; H04L 63/0884; H04L 63/0892; G06F 1/60; G06F 12/1408; G06F 1/30; G06F 2212/1052
See application file for complete search history.

(56) References Cited

U.S. PATENT DOCUMENTS

| | | | | |
|---|---|---|---|---|
| 8,280,955 | B1* | 10/2012 | Tyagi | H04L 67/2814 370/329 |
| 10,004,097 | B1* | 6/2018 | Somasandharam | H04W 76/11 |
| 2002/0167952 | A1* | 11/2002 | Watson | G06F 11/2033 370/401 |
| 2003/0002676 | A1* | 1/2003 | Stachura | H04L 63/164 380/260 |

(Continued)

OTHER PUBLICATIONS

Aboba et al., "RADIUS (Remote Authentication Dial in User Service) Support for Extensible Authetnication Protocol (EAP)", RFC 3579, Sep. 2003, pp. 1-47 https://tools.ietf.org/html/rfc3579 (Year: 2003).*

(Continued)

*Primary Examiner* — Ayoub Alata
(74) *Attorney, Agent, or Firm* — Hanley, Flight & Zimmerman, LLC

(57) ABSTRACT

Methods, apparatus, systems and articles of manufacture to establish a connection between a supplicant and a secured network are disclosed. An example method includes relaying, by executing an instruction with a processor, a first request for access to a secured network received from a supplicant to an authentication server. An identifier provided by the supplicant is stored in a memory. In response to detection of the processor resuming operation from a failure event, a second request for access to the secured network to the authentication server is transmitted on behalf of the supplicant, the second request including the identifier provided by the supplicant stored in the memory.

20 Claims, 6 Drawing Sheets

(56) References Cited

U.S. PATENT DOCUMENTS

| | | | | |
|---|---|---|---|---|
| 2005/0246445 A1* | 11/2005 | Panasyuk | ............... | G06F 21/31 |
| | | | | 709/227 |
| 2007/0047477 A1* | 3/2007 | Zheng | ................... | H04L 63/08 |
| | | | | 370/328 |
| 2007/0106894 A1* | 5/2007 | Zhang | ............... | H04L 63/0428 |
| | | | | 713/170 |
| 2008/0077425 A1* | 3/2008 | Johnson | ............. | G06Q 10/103 |
| | | | | 705/301 |
| 2014/0010073 A1* | 1/2014 | Shah | ..................... | H04L 45/28 |
| | | | | 370/228 |
| 2015/0334571 A1* | 11/2015 | Xu | ...................... | H04W 12/04 |
| | | | | 455/410 |
| 2016/0352588 A1* | 12/2016 | Subbarayan | ........... | H04L 69/16 |

OTHER PUBLICATIONS

Nelson et al., "Common Remote Authetnication Dial in User Service (RADIUS) Implementation Issues and Suggested Fixes", RFC 5080, Dec. 2007, pp. 1-29, https://tools.ietf.org/html/rfc5080 (Year: 2007).*

Chiba et al., "Dynamic Authorization Extensions to Remote Authentication Dial in User Service (RADIUS)", RFC 5176, Jan. 2008, pp. 1-35, https://tools.ietf.org/html/rfc5176 (Year: 2008).*

Vocal, "EAPoL—Extensible Authentication Protocol Over LAN" Apr. 2016, pp. 1-3, https://web.archive.org/web/20160402115337/http://www.vocal.com/secure-communication/eapol-extensible-authentication-protocol-over-lan/ (Year: 2016).*

* cited by examiner

METHODS AND APPARATUS TO ESTABLISH A CONNECTION BETWEEN A SUPPLICANT AND A SECURED NETWORK

FIELD OF THE DISCLOSURE

This disclosure relates generally to network access, and, more particularly, to methods and apparatus to establish a connection between a supplicant and a secured network.

BACKGROUND

Client devices (supplicants) desire to gain access to secure networks (e.g., private networks) to perform various tasks (e.g., access files, access web interfaces, etc.). To facilitate communications with a secure network, a client device will establish a connection with an endpoint (e.g., an authenticator) that controls access to the secure network. The endpoint typically communicates with an authentication server to determine whether credentials provided by the client device are sufficient to grant access to the secure network.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
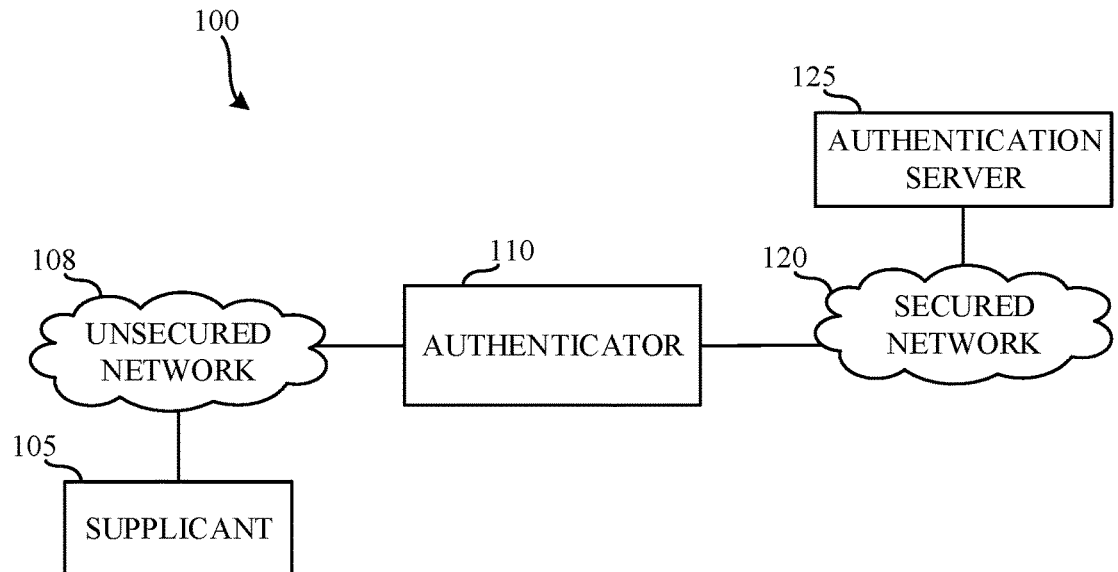
FIG. 1 is an example environment of use for enabling a supplicant to communicate with a secured network.

The Institute of Electrical and Electronics Engineers (IEEE) 802.1X Standard defines authentication mechanisms for client devices wishing to communicate with a secured network (e.g., a local area network (LAN) or wireless LAN (WLAN). IEEE 802.1X enables encapsulation of Extensible Authentication Protocol (EAP) communications over a local area network (LAN). Such encapsulation is referred to as "EAP over LAN" or EAPOL. EAPOL communications traditionally involve three parties (e.g., devices, nodes, etc.). A supplicant is a client device (e.g., a laptop, a smartphone, an Internet of Things (IoT) device, etc.) that wishes to gain access to a network (e.g., a secured network, a virtual private network (VPN), etc.). An authenticator is a network node (e.g., a switch, a router, an access point, etc.) that controls access by the supplicant to the network. In some examples, the authenticator interacts with an authentication server to determine whether to grant access to the supplicant. Once authenticated, communications between the supplicant and the secured network are routed through the authenticator.

Given the above architecture, access between an authorized supplicant and the secured network can be interrupted by a failure encountered at the authenticator (e.g., a power failure). In existing systems, upon resuming from a power failure, the authenticator resumes operation as if there were no authenticated supplicants (e.g., each supplicant must re-connect and re-authenticate). In existing systems, to re-establish the connection, the supplicant must identify that the previous connection has been lost and attempt to re-establish the connection to the secured network. Such an approach results in communications delays between the supplicant and the secure network, as the supplicant must first identify that the connection has been dropped (e.g., wait for a timeout), and must then attempt to re-establish the connection.

Example approaches disclosed herein enable the authenticator to proactively attempt to re-establish connections for previously authenticated supplicant devices in the event of a power failure. In examples disclosed herein, the authenticator maintains a list of supplicant identities for supplicants that have successfully authenticated. In examples disclosed herein, the list of supplicant identities is stored in a secure memory (e.g., a trusted platform module (TPM)) that persists through a power failure. Using the list of supplicant identities, the example authenticator attempts to re-establish the connection between the previously authenticated supplicant and the secured network without awaiting an initiation request from the supplicant.

Using the approaches disclosed herein reduces an amount of time required to re-establish the connection between the supplicant and the secured network. The example approaches disclosed herein do not compromise security of the network connectivity during re-establishment of the connection between the supplicant and the secured network as supplicant identities are stored in a secured memory (e.g., a TPM circuit). Moreover, while the authenticator initiates the re-establishment of the connection, the supplicant will still be requested to provide credentials that will be re-authenticated by the authentication server prior to completion of the re-establishment of the connection.

FIG. 1 is an example environment of use 100 for enabling a supplicant to communicate with a secured network. The example environment of use 100 of the illustrated example of FIG. 1 includes a supplicant 105 that communicates with an unsecured network 108 (e.g., a public network, the Internet, etc.). When authenticated by an authenticator 110, the supplicant 105 communicates with devices on a secured network 120 via the authenticator 110. In the illustrated example of FIG. 1, the authenticator 110 acts as a mediator that enables or disables access of the supplicant 105 to the secured network 120. In the illustrated example of FIG. 1, the example environment of use 100 includes an authentication server 125 that the authenticator 110 communicates with to determine whether to enable or disable access of the supplicant 105 to the secured network 120. In the illustrated example of FIG. 1, the authenticator 110 communicates with the authentication server 125 via the secured network 120. However, the authenticator 110 may communicate with the authentication server 125 in any other fashion.

The example supplicant 105 of the illustrated example of FIG. 1 is a client device (e.g., laptop, smartphone, desktop computer, Internet of Things (IoT) device, etc.) that wishes to communicate with the secured network 120. In examples disclosed herein, the supplicant is implemented by hardware. However, in some examples, the supplicant may be implemented by software and/or firmware executed at a client device.

The example unsecured network 108 of the illustrated example of FIG. 1 is implemented using any type of public and/or private network such as, for example, the Internet. In examples disclosed herein, the supplicant 105 communicates with the authenticator 110 via the unsecured network 108. However, in some examples, the supplicant 105 may communicate directly with the authenticator 110 (e.g., without any intervening networking equipment and/or network).

The example authenticator 110 of the illustrated example of FIG. 1 is implemented by a network device such as, for example, an Ethernet switch, a wireless access point, a router, etc. In examples disclosed herein, the example authenticator 110 enables or disables communications from a supplicant from reaching the secured network 120. That is, the supplicant 105 is not granted access to the secured network 120 until the supplicant 105 has been validated and/or authorized. In examples disclosed herein, the supplicant 105 provides credentials (e.g., a username and password, a digital certificate, etc.) to the authenticator 110. The authenticator 110 communicates with the authentication server 125 on behalf of the supplicant 105 to determine whether the supplied credentials are valid. If the authenticator 110 and/or authentication server 125 determine the credentials supplied by the supplicant 105 are valid, the authenticator 110 enables communications between the supplicant 105 and the secured network 120.

In examples disclosed herein, the example authenticator 110 stores identities of authenticated supplicants. Upon resuming after a power failure, the example authenticator 110 proactively attempts to re-establish the prior connections between the previously authenticated supplicants and the secured network. In examples disclosed herein, the authenticator 110 initiates the re-establishment of the connection by transmitting message(s) to the authentication server 125 including respective identifiers of each of the previously authenticated supplicants. In this manner, the supplicant 105 does not need to identify that the authenticator 110 has experienced a power failure and also does not need to re-provide the identity of the supplicant to the to the authenticator 110. An example implementation of the example authenticator 110 is further described in the illustrated example of FIG. 2.

The example secured network 120 of the illustrated example of FIG. 1 is a private network. In some examples, the secured network 120 is implemented as a virtual private network (VPN). In some examples, the secured network 120 enables devices that are authorized to communicate via the secured network 120 to reach secured services such as, for example, a file server, a web site, etc.

The example authentication server 125 of the illustrated example of FIG. 1 is implemented by a server that is responsive to authentication requests from the authenticator 110. In examples disclosed herein, the example authentication server 125 implements a Remote Authentication Dial-In User Service (RADIUS) protocol and an Extensible Authentication Protocol (EAP) protocol. However, any other past, present, and/or future standards, protocols, and/or services may additionally or alternatively be used such as, for example, an Authentication, Authorization, and Accounting (AAA) service. In examples disclosed herein, the authentication server 125 validates credentials provided by the authenticator 110 on behalf of a supplicant wishing to gain access to the secure network 120, to determine whether to grant access to the supplicant. While in the illustrated example of FIG. 1 the authentication server 125 is shown as being in communication with the authenticator 110 via the secured network 120, the authentication server 125 may communicate with the authenticator 110 in any other fashion. In some examples, the authentication server 125 is implemented as a component of the authenticator 110.

Figure 2:
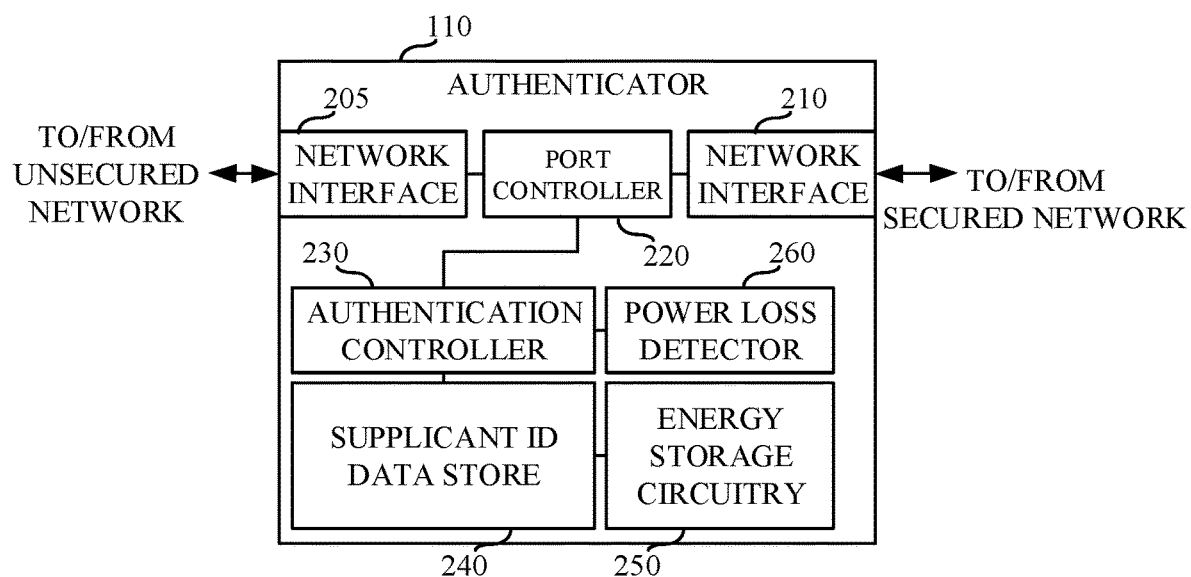
FIG. 2 is a block diagram of the example authenticator of FIG. 1.

FIG. 2 is a block diagram of the example authenticator 110 of FIG. 1. To facilitate communication between the unsecured network 108 (and/or the supplicant 105) and the secured network 120 (and/or the authentication server 125), the example authenticator 110 includes a first network interface 205 and a second network interface 210. The example first and second network interfaces 205, 210 are connected via a port controller 220. The example port controller 220 enables or disables communications between the first network interface 205 and the second network interface 210. The example port controller 220 is controlled by an authentication controller 230, and enables communications originating from the authentication controller 230 to reach the secured network 120 (e.g., to facilitate communications with the authentication server 125). The example authentication controller 230 stores supplicant identifiers in a supplicant ID data store 240. The example supplicant ID data store 240 is a persistent data store that stores data through power loss events. In the illustrated example of FIG. 2, the example supplicant ID data store 240 is powered by energy storage circuitry 250 (e.g., during a power loss event). Upon resuming operation after a power loss event, a power loss detector 260 identifies that operation is being resumed from the power loss event and instructs the authentication controller 230 to attempt to re-establish connections of previously authenticated supplicants, as identified in the supplicant ID data store 240. Initiating communications with a previously authenticated supplicant enables the supplicant 105 to more quickly reestablish communications with the secured network 120.

The first example network interface 205 of the illustrated example of FIG. 2 is implemented by an Ethernet network interface. However, the first example network interface 205 may be implemented in any other fashion. The first example network interface 205 enables communication with the supplicant 105 via the unsecured network 108.

The second example network interface 210 of the illustrated example of FIG. 2 is implemented by an Ethernet network interface. However, the second example network interface 210 may be implemented in any other fashion. The second example network interface 210 enables communication with the secured network 120 and/or the example authentication server 125. While in the illustrated example of FIG. 2, the first and second network interfaces 205, 210 are shown as separate network interfaces, in some examples, the first and second network interfaces 205, 210 may be implemented as a single network interface.

The example port controller 220 of the illustrated example of FIG. 2 enables and/or disables communications received from a supplicant via the first network interface 205 from reaching the secured network 120 via the second network interface 210. In examples disclosed herein, the example port controller 220 evaluates communications received at the first network interface to determine whether the communications originate from an authenticated supplicant. Communications received from an un-authenticated supplicant are rejected, while communications received from an authenticated supplicant are routed to the second network interface 210 (e.g., to the secured network 120).

The example authentication controller 230 of the illustrated example of FIG. 2 facilitates authorization/authentication of the supplicant 105 by communicating with the authentication server 125 on behalf of the supplicant 105. In some examples, the authentication controller 230 relays communications between the authentication server 125 and the supplicant 105. Upon successful authentication of the supplicant 105, the example authentication controller 230 stores an identifier of the supplicant in the supplicant ID data store 240. The example authentication controller 230, upon receipt of a logoff request from a connected supplicant, removes the identifier of the disconnecting supplicant from the supplicant ID data store 240. When resuming operation after a failure (e.g., a power failure), the example authentication controller 230 gathers supplicant identifiers stored in the supplicant ID data store 240 and begins re-initiating each of the previously established connections by transmitting the supplicant identifiers to the authentication server 125. In some examples, to prevent overloading the authentication server 125 with many supplicant identifiers at one time, the example authentication controller 230 may throttle (e.g., delay) some of the messages to the authentication server 125.

The example supplicant ID data store 240 may be implemented by any device for storing data such as, for example, flash memory, magnetic media, optical media, etc. Furthermore, the data stored in the example supplicant ID data store 240 may be in any format such as, for example, binary data, comma separated data, tab delimited data, structured query language (SQL) structures, etc. While, in the illustrated example, the example supplicant ID data store 240 is illustrated as a single memory element, the example supplicant ID data store 240 may be implemented by any number and/or type(s) of memory elements(s). The example supplicant ID data store 240 stores supplicant identifiers that identify supplicants that have successfully authenticated with the authentication server 125.

In some examples, the example supplicant ID data store 240 is implemented using a trusted platform module (TPM) circuit. That is, data (e.g., the supplicant identifiers) stored in the example supplicant ID data store 240 is encrypted and/or protected such that the data stored in the example supplicant ID data store 240 cannot be easily read by entities other than the authentication controller 230.

The example energy storage circuitry 250 of the illustrated example of FIG. 2 is implemented by one or more capacitors. However, the example energy storage circuitry 250 may be implemented in any other fashion such as, for example, by a battery, by a super capacitor, etc. Any number(s) and/or type(s) of energy storage circuitry may be used. In examples disclosed herein, the example energy storage circuitry 250 supplies energy to the supplicant ID data store 240 to enable the supplicant ID data store 240 to securely store data received from the authentication controller 230 (e.g., to prevent data corruption in the event of a power failure).

The example power loss detector 260 of the illustrated example of FIG. 2 determines, upon initialization (e.g., power up, booting, etc.) of the authenticator 110, whether the initialization is in response to a power loss event. In some examples, the example power loss detector 260 monitors the energy storage circuitry 250 to identify an available energy remaining, and may identify a power loss event when the available energy remaining is below a power threshold. However, any other approach to identifying when an initialization of the authenticator 110 is in response to a power loss event may additionally or alternatively be used. While example approaches disclosed herein detect whether an initialization of the authenticator 110 is in response to a power loss event, any other type of failure event may additionally or alternatively be identified. For example, in the event of a system crash, the system failure may be detected, and the example authentication controller 230 may attempt to re-establish the previous connections.

Figure 3:
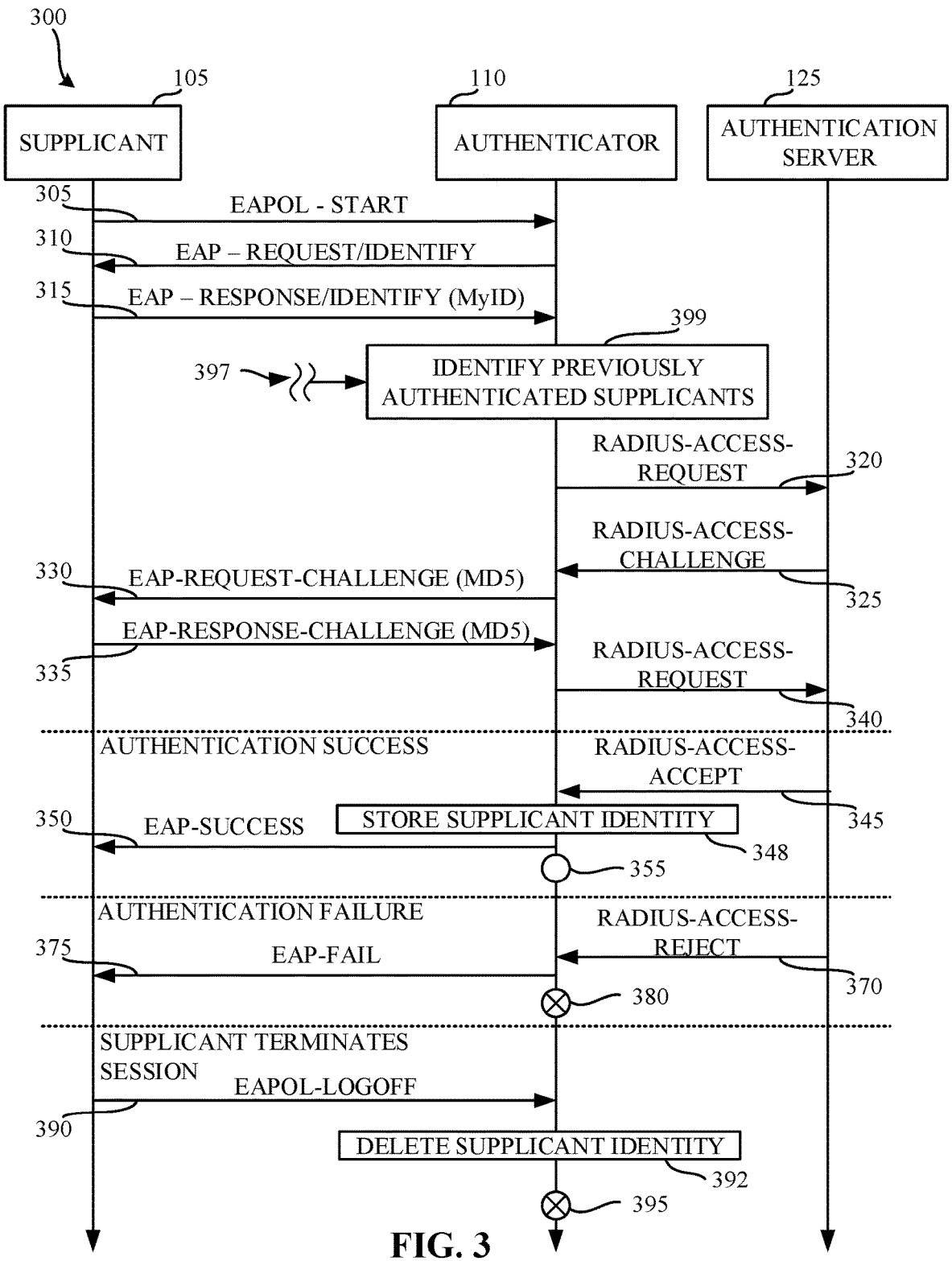
FIG. 3 is a communication diagram illustrating an example approach for authenticating a supplicant.

FIG. 3 is a communication diagram 300 illustrating an example approach for authenticating a supplicant 105. In the illustrated example of FIG. 3, the example communication diagram 300 begins when the example supplicant 105 transmits an Extensible Authentication Protocol (EAP) Over Local Area Network (EAPOL) START message to the authenticator 110 (message 305). In some examples, the supplicant 105 transmits the EAPOL START message to the authenticator 110 upon first connecting to a local area network (e.g., the unsecured network 108). However, the example supplicant 105 may transmit the EAPOL START message at any other time such as, for example, in response to a user instruction to connect to the secured network 120. In some examples, the EAPOL START message is transmitted as a broadcast message (e.g., the EAPOL START message is not uniquely transmitted to the authenticator 110). However, in some examples, the EAPOL START message may be transmitted as a unicast message (e.g., directly to the authenticator 110).

The example authenticator 110 transmits an EAP REQUEST/IDENTIFY message to the supplicant 105 (message 310). In examples disclosed herein, the example EAP REQUEST/IDENTIFY requests the supplicant 105 to provide an identity (e.g., a username, a device identifier, etc.) to the authenticator 110. The example supplicant 105 responds with an EAP RESPONSE/IDENTIFY message (message 315) that includes the requested identity.

The example authenticator 110 forwards the received identity of the supplicant 105 to the authentication server 125 via a Remote Authentication Dial-In User Service (RADIUS) ACCESS-REQUEST message (message 320). The example authentication server 125 responds with a RADIUS ACCESS-CHALLENGE message (message 325). The example RADIUS ACCESS-CHALLENGE message requests that the supplicant 105 provide credentials and, in some examples, identifies the type of authentication that will be used. The example authenticator 110 transmits an EAP REQUEST/CHALLENGE message (message 330) to the example supplicant 105. The example supplicant 105 provides a response to the challenge in the form of an EAP RESPONSE-CHALLENGE message (message 335). The example EAP RESPONSE-CHALLENGE message includes credentials of the supplicant 105 to be passed to the authentication server 125 for authentication. The example authenticator 110 transmits the credentials of the supplicant to the authentication server 125 via a RADIUS ACCESS-REQUEST message (message 340). The authentication server 125 then evaluates the credentials to determine whether the supplicant 105 should be granted access to the secured network 120.

If the authentication server 125 identifies that the supplicant 105 has successfully authenticated (e.g., should be granted access to the secured network 120) the example authentication server 125 responds to the authenticator 110 with a RADIUS ACCESS-ACCEPT message (message 345). The example authenticator 110 stores the identity of the supplicant 105 (block 348), so that the supplicants connection can be proactively restored in the event of a failure. The example authenticator 110 then transmits an EAP SUCCESS message (message 350) to the supplicant informing the supplicant 105 of the successful authentication. The example authenticator 110 then enables communications from the supplicant 105 to be routed to the secured network 120 (block 355).

If the authentication server 125 identifies that the supplicant 105 has not successfully authenticated (e.g., should not be granted access to the secured network 120), the example authentication server 125 responds to the authenticator 110 with a RADIUS ACCESS REJECT message (message 370). The example authenticator 110 transmits an EAP FAIL message (message 375) to the supplicant 105 informing the supplicant of the failed authentication. The example authenticator 110 then ensures that communications from the supplicant 105 are not permitted to reach the secured network 120 (block 380). The example supplicant 105 may then re-attempt authorization to attempt to establish connectivity with the secured network 120.

In some examples, the supplicant 105 may wish to disconnect from the secured network 120. In such an example, the example supplicant 105 may transmit an EAPOL LOG-OFF message (message 390) to the authenticator 110. The example authenticator 110 deletes the identity of the supplicant 105 (block 392) to prevent the closed connection from being re-established in the event of a failure. The example authenticator 110 then ensures that the communications from the supplicant 105 are no longer permitted to reach the secured network 120 (block 395). The example supplicant 105 may then re-attempt authorization to attempt to re-establish connectivity with the secured network 120.

In a typical failure scenario occurring at the authenticator 110, the example communication sequence of FIG. 3 is restarted at message 305. During such a failure (e.g., a power failure), the example authenticator 110 will tend orphan or lose its secured connectivity with prior supplicants. In such scenarios, the supplicant 105 must identify that the connection has dropped and attempt to re-establish the connection. In some examples, awaiting the communications from the supplicant 105 to reestablish the supplicant's connection with the secured network 120 encounters delays in communications between the supplicant 105 and the secured network 120 (e.g. delays encountered as a result of the acknowledgment phase).

In examples disclosed herein, the authenticator stores supplicant identifiers in the example supplicant ID data store 240 (see block 348) to enable the authenticator 110 to proactively initiate reconnection of the supplicant 105 to the secured network 120 in the event of a failure. In the event of a failure (failure 397), control proceeds to block 399, where the example authenticator 110 identifies previously authenticated supplicants (block 399) and proceeds to message the authentication server 125 to re-initiate the connections on behalf of the previously connected supplicants.

Figure 4:
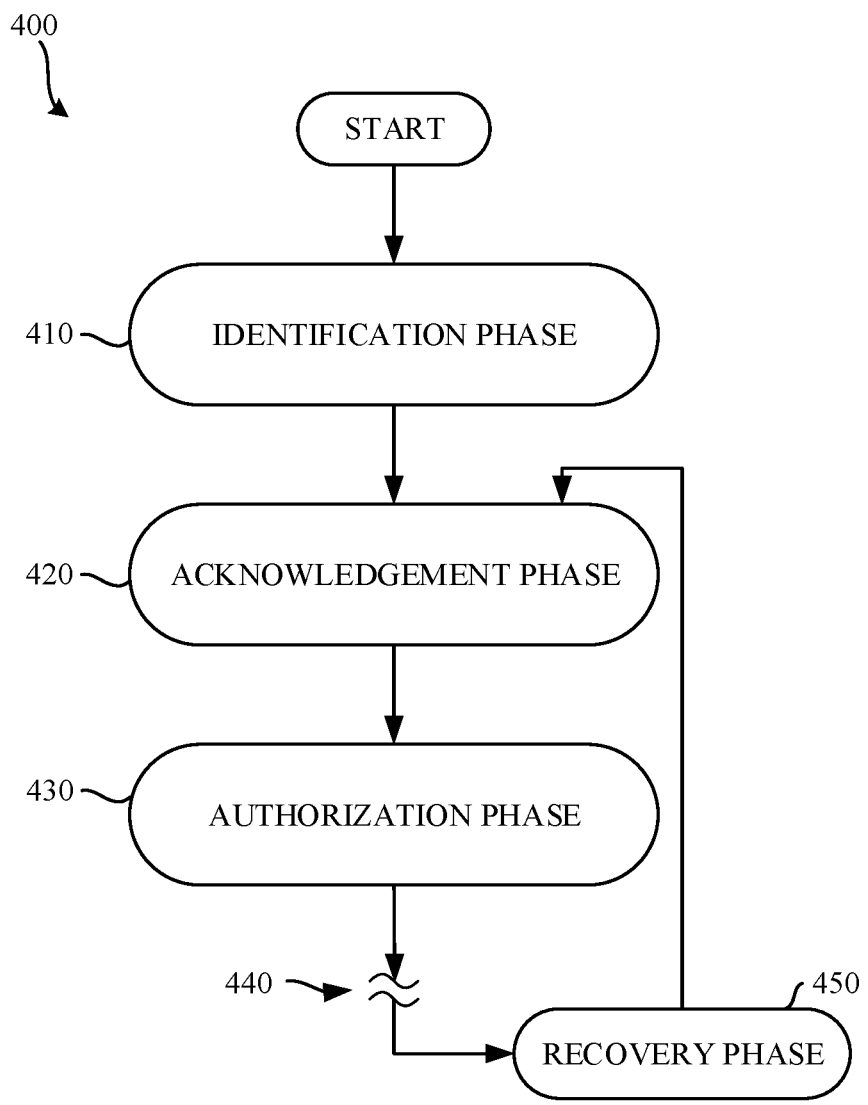
FIG. 4 is a flow diagram representing an example authentication flow implemented in accordance with the teachings of this disclosure.

FIG. 4 is a flow diagram 400 representing an example authentication flow implemented in accordance with the teachings of this disclosure. The example flow diagram 400 of the illustrated example of FIG. 4 begins with the authenticator 110 in the identification phase 410. In the example identification phase 410, the example authenticator 110 waits for a supplicant 105 to transmit an EAPOL START message (e.g., message 305 of FIG. 3) to initiate authentication of the supplicant 105 for communication with the secured network 120. Upon receipt of the EAPOL-START message (e.g., message 305 of FIG. 3) the example authenticator 110 obtains an identity of the supplicant 105, and transitions to an acknowledgment phase (block 420). In the example acknowledgment phase, the authenticator 110 relays information between the supplicant 105 and the authentication server 125 to determine whether to authorize communications between the supplicant 105 and the secure network 120. Upon a determination of whether to grant the supplicant 105 access to the secured network 120, the example authenticator 110 transitions to an authorization phase (block 430) where the communications between the supplicant 105 and the secured network 120 are either authorized (e.g., routed) or unauthorized (e.g., blocked). When enabling communications between the supplicant and the secured network, the example authenticator 110 stores the identifier of the supplicant 105. Storing the identifier of the supplicant enables the authenticator 110 to later re-initiate the connection between the supplicant 105 and the secured network 120 in the event of a failure (e.g., a power loss) at the authenticator 110.

In examples disclosed herein, in response to a failure event occurring at the authenticator 110 (e.g., power failure 440), control proceeds to a recovery phase (block 450) (instead of the identification phase 510), where the authenticator 110 identifies supplicants that were previously authorized, and then to the acknowledgement phase (block 420) where the authenticator 110 transmits a RADIUS-ACCESS-REQUEST message (e.g., message 320) to the authentication server 125 using the stored supplicant identifier, thereby re-initiating the set-up of the connection between the supplicant 105 and the secure network 120. In this manner, instead of waiting on the supplicant 105 to identify that a power failure has occurred at the authenticator 110 (e.g., to identify that a device separate from the supplicant 105 has experienced a failure and re-identify itself to the authenticator 110), the example authenticator 110 proactively contacts the authentication server 125 to begin re-establishing the connections with each of the previously-connected supplicants.

While an example manner of implementing the example authenticator 110 of FIG. 1 is illustrated in FIG. 2, one or more of the elements, processes and/or devices illustrated in FIGS. 1 and/or 2 may be combined, divided, re-arranged, omitted, eliminated and/or implemented in any other way. Further, the example first network interface 205, the example second network interface 210, the example port controller 220, the example authentication controller 230, the example supplicant ID data store 240, the example energy storage circuitry 250, the example power loss detector 260, and/or, more generally, the example authenticator 110 of FIGS. 1 and/or 2 may be implemented by hardware, software, firmware and/or any combination of hardware, software and/or firmware. Thus, for example, any of the example first network interface 205, the example second network interface 210, the example port controller 220, the example authentication controller 230, the example supplicant ID data store 240, the example energy storage circuitry 250, the example power loss detector 260, and/or, more generally, the example authenticator 110 of FIGS. 1 and/or 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example first network interface 205, the example second network interface 210, the example port controller 220, the example authentication controller 230, the example supplicant ID data store 240, the example energy storage circuitry 250, the example power loss detector 260, and/or, more generally, the example authenticator 110 of FIGS. 1 and/or 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example authenticator 110 of FIGS. 1 and/or 2 may include one or more elements, processes and/or devices in addition to, or instead of, those illustrated in FIG. 2, and/or may include more than one of any or all of the illustrated elements, processes and devices.

Figure 5:
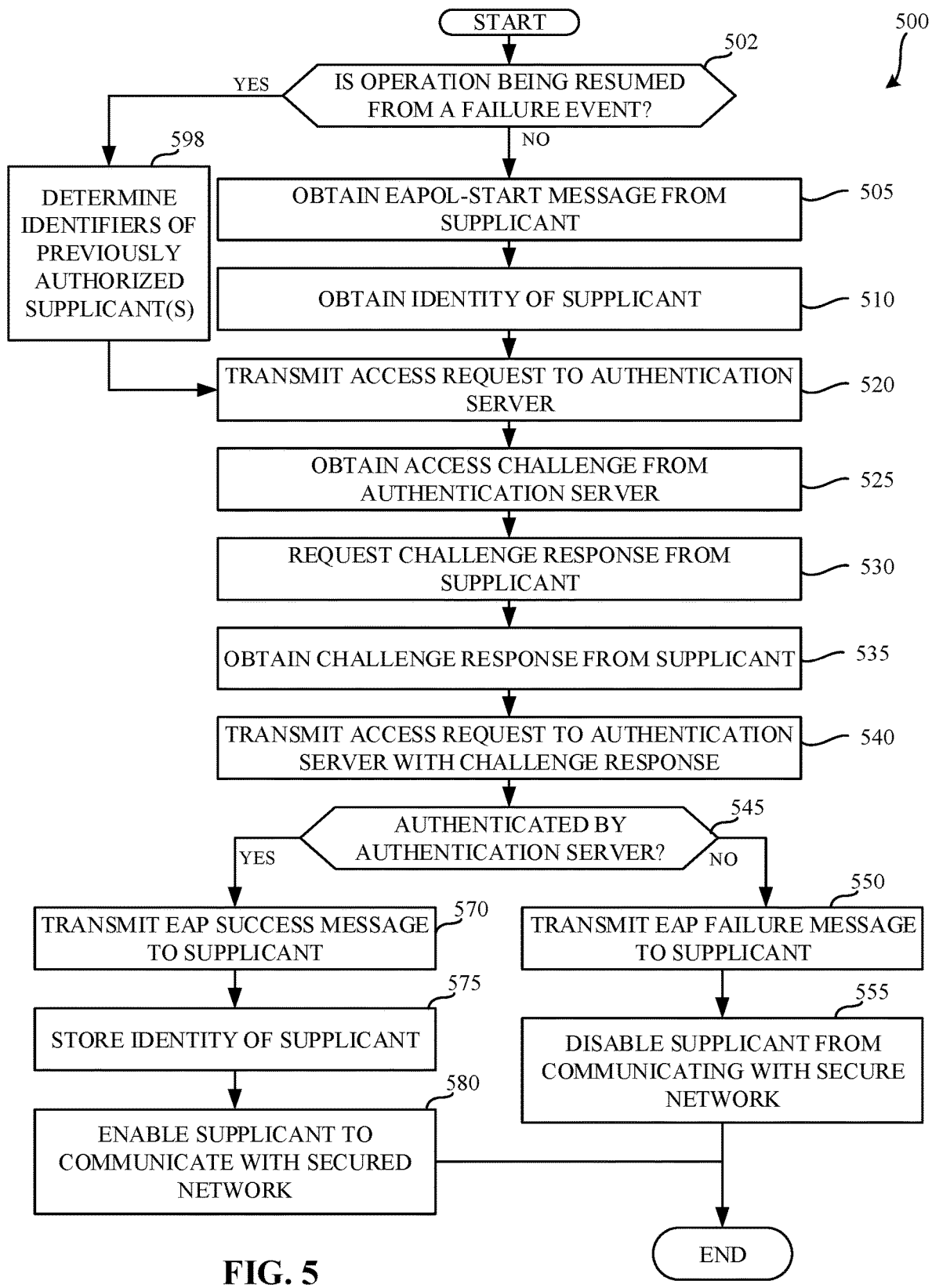
FIG. 5 is a flowchart representative of example machine readable instructions which, when executed, cause the example authenticator of FIG. 1 to authenticate a supplicant.

Flowcharts representative of example machine readable instructions for implementing the example authenticator 110 of FIGS. 1 and/or 2 are shown in FIGS. 5 and/or 6. In these examples, the machine readable instructions comprise a program(s) for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart(s) illustrated in FIGS. 5 and/or 6, many other methods of implementing the example authenticator 110 may alternatively be used. For example, the order of execution of the blocks may be changed, and/or some of the blocks described may be changed, eliminated, or combined.

As mentioned above, the example processes of FIGS. 5 and/or 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5 and/or 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 5 is a flowchart representative of example machine readable instructions which, when executed, cause the example authenticator 110 of FIG. 1 to authenticate a supplicant 105. The example process 500 of the illustrated example of FIG. 5 begins when the example authenticator 110 is booted (e.g., is powered on). The example power loss detector 260 determines whether the operation of the authenticator 110 is being resumed from a failure (e.g., a power failure, a power glitch, etc.) (block 502). In examples disclosed herein, the example power loss detector 260 determines whether the operation of the authenticator 110 is being resumed after a power failure by measuring an amount of energy stored in the storage circuitry 250 and comparing the measured amount of energy to a threshold. An amount of energy stored in the energy storage circuitry 250 that is below the threshold indicates that the energy storage circuitry 250 was drained during a power failure event. Conversely, an amount of energy stored in the energy storage circuitry 250 that is greater than or equal to the threshold indicates that the energy storage circuitry 250 was not drained (e.g., there was no power failure event).

If the example power loss detector 260 identifies that the operation of the authenticator 110 is not being resumed from the power failure (e.g., block 502 returns a result of NO), control proceeds to block 505, where the example authentication controller 230 awaits EAPOL START messages from the supplicant 105 (block 505). In response to the EAPOL-START message, the example authentication controller 230 obtains an identity of the supplicant 105 (block 510). In examples disclosed herein, the example authentication controller 230 obtains the identity of the supplicant by transmitting an EAP REQUEST/IDENTIFY message to the supplicant 105, and waiting for an EAP RESPONSE/IDENTIFY message including the identity of the supplicant 105 from the supplicant 105. However, any other approach to obtaining an identity of the supplicant may additionally or alternatively be used.

The example authentication controller 230 transmits an access request message to the authentication server 125 (block 520). In examples disclosed herein, the example access request message is formatted as a RADIUS ACCESS-REQUEST message and includes the identity of the supplicant 105. However, any other past, present, and/or future type(s) of message(s) may additionally or alternatively be used. The example authentication controller 230 obtains an access challenge message from the authentication server 125 (block 525). In examples disclosed herein, the access challenge message received from the authentication server 125 is formatted as a RADIUS ACCESS-CHALLENGE message. However, any other type of message may additionally or alternatively be used. In examples disclosed herein, the example access challenge message is relayed to the supplicant 105 as an EAP-REQUEST-CHALLENGE message, which requests that the supplicant provide credentials. The example authentication controller 230 obtains a challenge response from the supplicant 105 (block 535). In examples disclosed herein, the example challenge response message is formatted as an EAP RESPONSE-CHALLENGE message. However, any other type of message may additionally or alternatively be used. The example authentication controller 230 transmits an access request message to the authentication server 125 with the challenge response (e.g., the credentials) received from the supplicant 105 (block 540). In examples disclosed herein, the example access request message is formatted as a RADIUS ACCESS-REQUEST message. However, any other type of message may additionally alternatively be used.

The example authentication controller 230 then awaits a response from the authentication server 125 (block 545). The response from the authentication server 125 will either indicate that the supplicant 105 has been authenticated (and is to be granted access) or has not been authenticated (and is to be denied access). If the example authentication controller 230 determines that the supplicant 105 has not been authenticated by the authentication server 125 (block 545 returns a result of NO), the example authentication controller 230 transmits a failure message (e.g., an EAP-FAIL message) to the supplicant 105 indicating that the authentication has failed (block 550). The example authentication controller 230 then instructs the port controller 220 to disable the supplicant 105 from communicating with the secure network 120 (block 555). In some examples, the supplicant 105 may not have previously been granted access to the secured network 120 and, as such, the example port controller 220 might not make any change with respect to the denial of access to the secured network 120 by the supplicant 105.

If the example authentication controller 230 determines that the supplicant 105 has been authenticated by the authentication server 125 (block 545 returns a result of YES), the example authentication controller 230 transmits a success message (e.g., an EAP-SUCCESS message) to the supplicant 105 indicating that the authentication was successful (block 570). The example authentication controller 230 stores the identity of the supplicant (e.g. the identity of the supplicant obtained in block 510) in the supplicant ID data store 240. Storing the identity of the supplicant 105 enables the authenticator 110 to proactively reinitiate the secure connection between the supplicant 105 and the secured network 120 in the event of a power failure at the authenticator 110. While in the illustrated example of FIG. 5 the identity of the supplicant 105 is stored in response to a successful authentication by the authentication server 125, in some examples, the identity of the supplicant may be stored in response to the identity of the supplicant being obtained (e.g., in response to the completion of block 510). The example authentication controller 230 instructs the port controller 220 to enable the supplicant 105 to communicate with the secure network 120 (block 580). The example process 500 of the illustrated example of FIG. 5 then terminates. In some examples, the example process returns to block 505, where the authenticator 110 awaits a subsequent EAPOL-START message from a supplicant. While in the illustrated example of FIG. 5, the example process 500 is illustrated with respect to a single supplicant, the example process 500 may be executed in parallel in connection with multiple different supplicants to enable the multiple supplicants to authenticate and/or communicate with the secured network 120.

Returning to block 502, if the example power loss detector 260 identifies that the operation of the authenticator 110 is being resumed from a failure, the example authentication controller 230 determines identifiers of previously authorized supplicants stored in the supplicant ID data store 240 (block 598, see the supplicants stored in connection with block 575). Control then proceeds to block 520 of the illustrated example of FIG. 5, where the example authentication controller 230 transmits access request messages to the authentication server 125 including each of the stored identifiers of the previously authorized supplicants. In examples disclosed herein, separate messages are transmitted for each of the identified supplicants. However, in some examples, a single message identifying each of the supplicants may be transmitted to the authentication server 125. The process of blocks 530 through 580 is then performed for each of the supplicant identifiers identified in the supplicant ID data store 240 to attempt to re-establish each respective connection.

Figure 6:
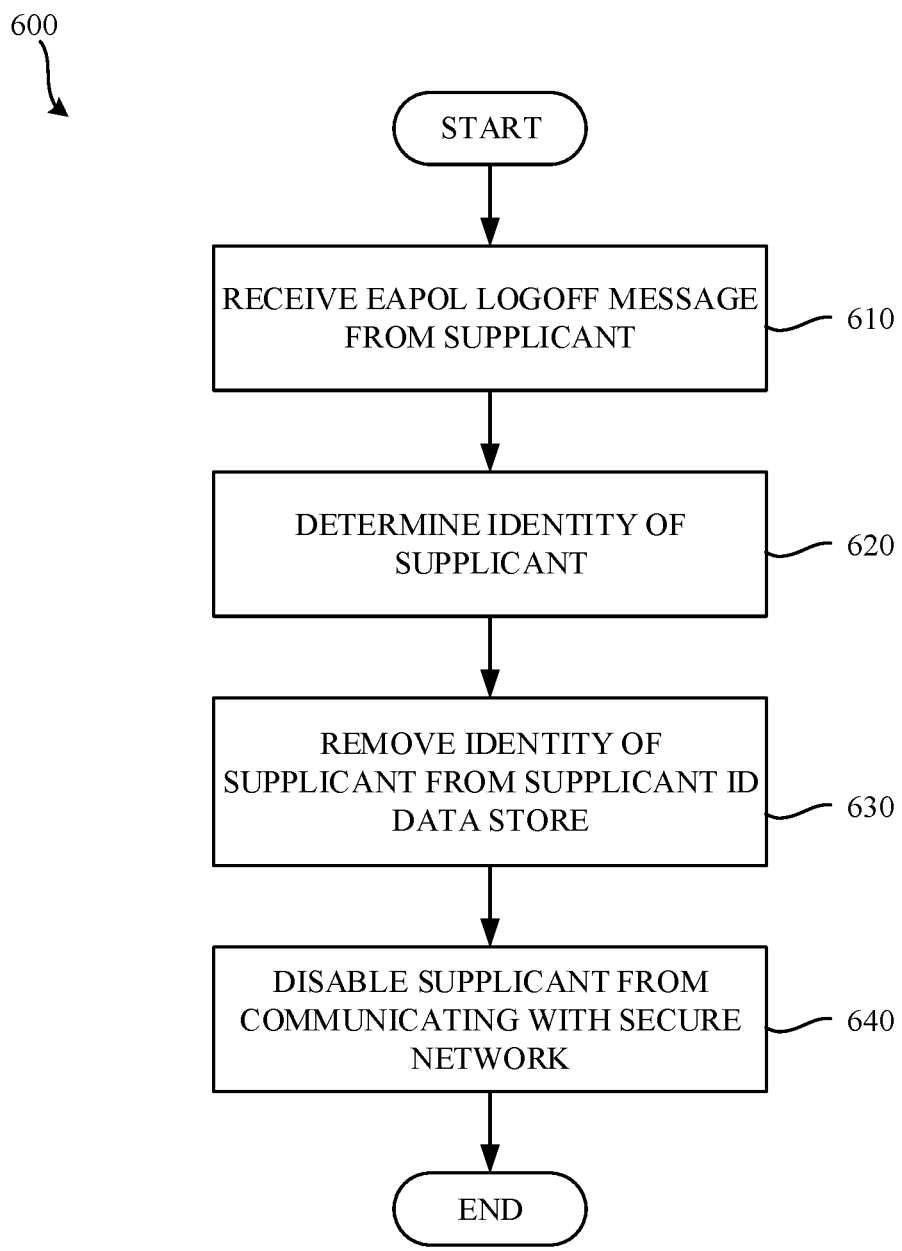
FIG. 6 is a flowchart representative of example machine readable instructions which, when executed, cause the example authenticator of FIG. 1 to remove a supplicant identifier from the supplicant ID data store of FIG. 2 in response to a logoff message received from the supplicant.

FIG. 6 is a flowchart representative of example machine readable instructions 600 which, when executed, cause the example authenticator 110 of FIG. 1 to remove a supplicant identifier from the supplicant ID data store 240 of FIG. 2 in response to a logoff message received from the supplicant 105. The example process 600 of the illustrated example of FIG. 6 begins when the example authentication controller 230 receives a logoff message (e.g., an EAPOL-LOGOFF message) from the supplicant 105 (block 610). The example authentication controller 230 determines an identity of the supplicant 105 (block 620). In examples disclosed herein the example logoff message includes the identity of the supplicant that transmitted the message. However, any other approach to identifying a supplicant that transmitted a logoff message may additionally or alternatively be used. The example authentication controller 230 removes the identity of the supplicant from the supplicant ID data store 240 (block 630) (e.g., the identity of the supplicant that was stored in the supplicant ID data store 240 in connection with block 575). Removing the identity of the supplicant from the supplicant ID data store 240 ensures that in the event of failure event (e.g., a power failure), the example authentication controller 230 does not reattempt to connect the supplicant (who has indicated their desire to log off of the network). The example authentication controller 230 then instructs the port controller 220 to disable the supplicant 105 from communicating with the secure network 120 (block 640).

Figure 7:
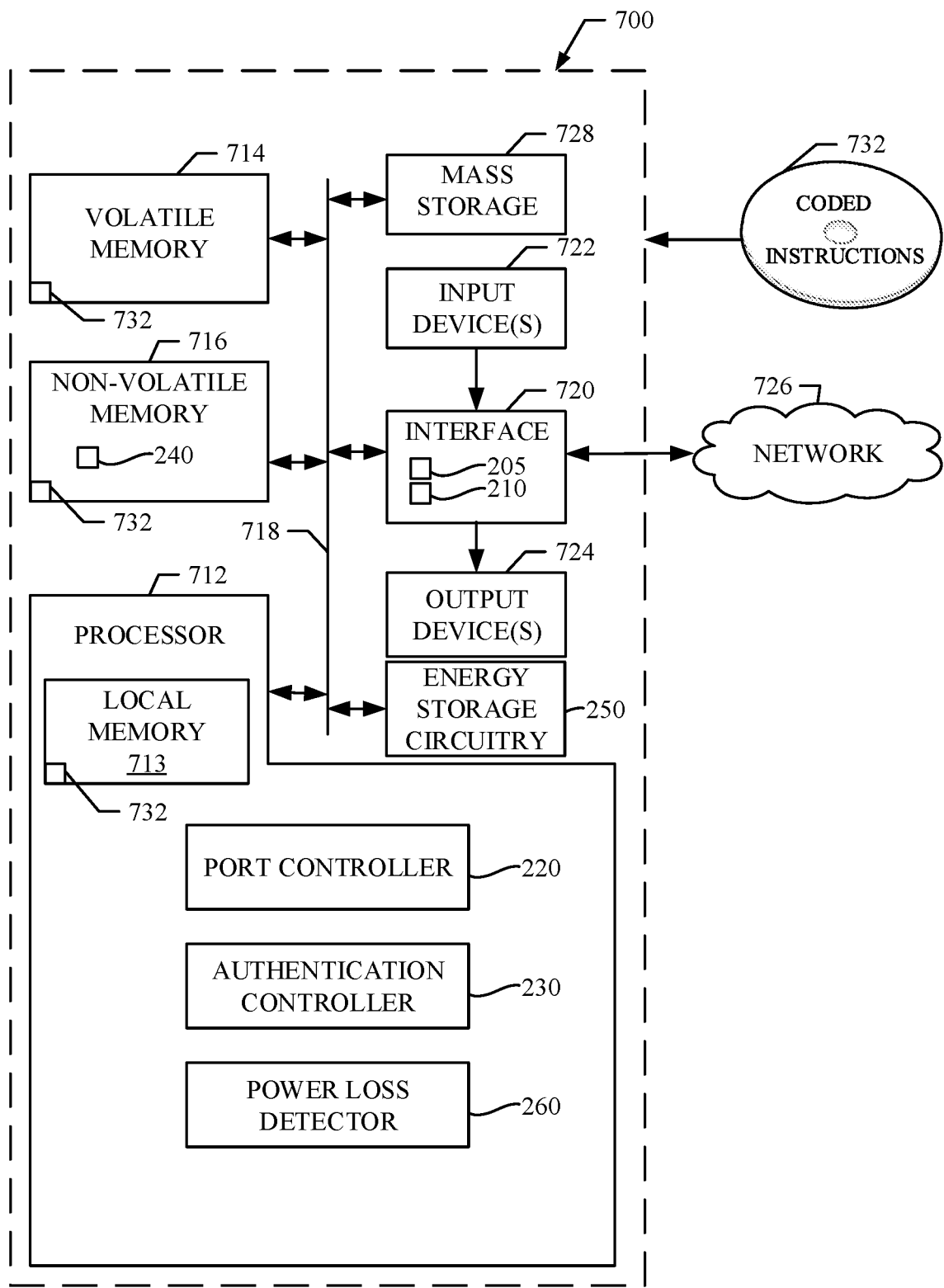
FIG. 7 is a block diagram of an example processor platform capable of executing the instructions of FIGS. 5 and/or 6 to implement the example authenticator of FIGS. 1 and/or 2.

FIG. 7 is a block diagram of an example processor platform 700 capable of executing the instructions of FIGS. 5 and/or 6 to implement the example authenticator 110 of FIGS. 1 and/or 2. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache) and executes instructions to implement the example port controller 220, the example authentication controller 230, and/or the example power loss detector 260. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller. In the illustrated example of FIG. 7, the example non-volatile memory 716 implements the example supplicant ID data store 240. However, in some examples, the example supplicant ID data store 240 may be implemented by a TPM circuit and, as such, may be implemented separately from the non-volatile memory 716.

The processor platform 700 of the illustrated example also includes an interface circuit 720. The interface circuit 720 may be implemented by any type of interface standard, such as an Ethernet interface, a universal serial bus (USB), and/or a PCI express interface. The example interface circuit 720 of the illustrated example of FIG. 7 implements the example first network interface 205 and/or the example second network interface 210.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 5 and/or 6 may be stored in the mass storage device 728, in the volatile memory 714, in the non-volatile memory 716, and/or on a removable tangible computer readable storage medium such as a CD or DVD.

In the illustrated example of FIG. 7, the example processor platform 700 includes the example energy storage circuitry 250. While in the illustrated example of FIG. 7, the example energy storage circuitry 250 is implemented as an internal component of the processor platform, in some examples the example energy storage circuitry 250 may be implemented external to the processor platform (e.g., may be implemented by a replaceable battery).

From the foregoing, it will be appreciated that the above disclosed methods, apparatus and articles of manufacture enable an authenticator to establish a connection between a supplicant and a secured network. Moreover, the example approaches disclosed herein enable the authenticator to re-establish such connections between the supplicant and the secured network in the event of a failure at the authenticator. Proactively attempting to re-establish connections for previously connected supplicants is beneficial because it avoids delays associated with the supplicant identifying that its connection has been dropped as well as delays associated with providing the identity of the supplicant to the authenticator. In examples disclosed herein, because the authenticator already knows the identities of the previously connected supplicants, the authenticator can communicate with the authentication server 125 to begin re-establishing the connection without waiting for the supplicant.

Example 1 includes an apparatus to establish a connection between a supplicant and a secured network, the apparatus comprising a supplicant identifier data store, an authentication controller to relay a first request for access to a secured network received from a supplicant to an authentication server, the authentication controller to store an identifier provided by the supplicant in the supplicant identifier data store, and a power loss detector to, in response to detection of the apparatus resuming operation from a failure event, indicate to the authentication controller that a failure event occurred, the authentication controller to transmit a second request for access to the secured network to the authentication server on behalf of the supplicant, the second request including the identifier provided by the supplicant stored in the supplicant identifier data store.

Example 2 includes the apparatus of example 1, wherein the authentication controller is to store the identifier in response to a determination that the supplicant is to be granted access to the secured network.

Example 3 includes the apparatus of any one of examples 1-2, wherein the supplicant identifier data store is implemented using a trusted platform module.

Example 4 includes the apparatus of any one of examples 1-3, wherein the first request is an Extensible Authentication Protocol Response/Identify message.

Example 5 includes the apparatus of any one of examples 1-4, wherein the second request is a Remote Authentication Dial-In User Service Access Request message.

Example 6 includes the apparatus of any one of examples 1-5, wherein the authentication controller is further to, in response to a third request received from the supplicant, remove the identifier from the supplicant identifier data store.

Example 7 includes a method of establishing a connection between a supplicant and a secured network, the method comprising relaying, by executing an instruction with a processor, a first request for access to a secured network received from a supplicant to an authentication server, storing, by executing an instruction with the processor, an identifier provided by the supplicant in a memory, and in response to detection of the processor resuming operation from a failure event, transmitting a second request for access to the secured network to the authentication server on behalf of the supplicant, the second request including the identifier provided by the supplicant stored in the memory.

Example 8 includes the method of example 7, wherein the storing of the identifier is performed in response to a determination that the supplicant is to be granted access to the secured network.

Example 9 includes the method of any one of examples 7-8, wherein the failure event is a power loss event.

Example 10 includes the method of any one of examples 7-9, wherein the memory is implemented using a trusted platform module.

Example 11 includes the method of any one of examples 7-10, wherein the first request is an Extensible Authentication Protocol Response/Identify message.

Example 12 includes the method of any one of examples 7-11, wherein the second request is a Remote Authentication Dial-In User Service Access Request message.

Example 13 includes the method of any one of examples 7-12, further including, in response to a third request received from the supplicant, removing the identifier from the memory.

Example 14 includes at least one tangible machine readable storage medium comprising instructions which, when executed, cause a processor to at least relay a first request for access to a secured network received from a supplicant to an authentication server, store an identifier provided by the supplicant in a memory, and in response to detection of the processor resuming operation from a failure event, transmit a second request for access to the secured network to the authentication server on behalf of the supplicant, the second request including the identifier provided by the supplicant stored in the memory.

Example 15 includes the at least one tangible machine readable storage medium of example 14, wherein the storing of the identifier is performed in response to a determination that the supplicant is to be granted access to the secured network.

Example 16 includes the at least one tangible machine readable storage medium of any one of examples 14-15, wherein the failure event is a power loss event.

Example 17 includes the at least one tangible machine readable storage medium of any one of examples 14-16, wherein the memory is implemented using a trusted platform module.

Example 18 includes the at least one tangible machine readable storage medium of any one of examples 14-17, wherein the first request is an Extensible Authentication Protocol Response/Identify message.

Example 19 includes the at least one tangible machine readable storage medium of any one of examples 14-18, wherein the second request is a Remote Authentication Dial-In User Service Access Request message.

Example 20 includes the at least one tangible machine readable storage medium of any one of examples 14-19, wherein the instructions, when executed, further cause the processor to, in response to a third request received from the supplicant, remove the identifier from the memory.

Example 21 includes an apparatus to establish a connection between a supplicant and a secured network, the apparatus comprising means for relaying a first request for access to a secured network received from a supplicant to an authentication server, means for storing an identifier provided by the supplicant in a memory, and means for transmitting, in response to detection of the processor resuming operation from a failure event, a second request for access to the secured network to the authentication server on behalf of the supplicant, the second request including the identifier provided by the supplicant stored in the memory.

Example 22 includes the apparatus of example 21, wherein the means for storing is to store the identifier in response to a determination that the supplicant is to be granted access to the secured network.

Example 23 includes the apparatus of any one of examples 21-22, wherein the failure event is a power loss event.

Example 24 includes the apparatus of any one of examples 21-23, wherein the memory is implemented using a trusted platform module.

Example 25 includes the apparatus of any one of examples 21-24, wherein the first request is an Extensible Authentication Protocol Response/Identify message.

Example 26 includes the apparatus of any one of examples 21-25, wherein the second request is a Remote Authentication Dial-In User Service Access Request message.

Example 27 includes the apparatus of any one of examples 21-26, further including means for removing the identifier from the memory in response to a third request received from the supplicant.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to establish a connection between a supplicant and a secured network, the apparatus comprising:
   a supplicant identifier data store implemented using a trusted platform module;
   an authentication controller to relay a first request for access to a secured network received from a supplicant to an authentication server, the authentication controller to store an identifier provided by the supplicant in the supplicant identifier data store; and
   a power loss detector to, in response to detection of the apparatus resuming operation from a failure event, indicate to the authentication controller that a failure event occurred, the authentication controller to transmit a second request for access to the secured network to the authentication server on behalf of the supplicant, the second request including the identifier provided by the supplicant stored in the supplicant identifier data store, wherein at least one of the supplicant identifier data store, the authentication controller, or the power loss detector are implemented by hardware.

2. The apparatus of claim 1, wherein the authentication controller is to store the identifier in response to a determination that the supplicant is to be granted access to the secured network.

3. The apparatus of claim 1, wherein the first request is an Extensible Authentication Protocol Response/Identify message.

4. The apparatus of claim 1, wherein the second request is a Remote Authentication Dial-In User Service Access Request message.

5. The apparatus of claim 1, wherein the authentication controller is further to, in response to a third request received from the supplicant, remove the identifier from the supplicant identifier data store.

6. A method of establishing a connection between a supplicant and a secured network, the method comprising:
   relaying, by executing an instruction with a processor, a first request for access to a secured network received from a supplicant to an authentication server;
   storing, by executing an instruction with the processor, an identifier provided by the supplicant in a memory implemented using a trusted platform module; and
   in response to detection of the processor resuming operation from a failure event, transmitting a second request for access to the secured network to the authentication server on behalf of the supplicant, the second request including the identifier provided by the supplicant stored in the memory.

7. The method of claim 6, wherein the storing of the identifier is performed in response to a determination that the supplicant is to be granted access to the secured network.

8. The method of claim 6, wherein the failure event is a power loss event.

9. The method of claim 6, wherein the first request is an Extensible Authentication Protocol Response/Identify message.

10. The method of claim 6, wherein the second request is a Remote Authentication Dial-In User Service Access Request message.

11. The method of claim 6, further including, in response to a third request received from the supplicant, removing the identifier from the memory.

12. At least one tangible machine readable storage medium comprising instructions which, when executed, cause a processor to at least:
relay a first request for access to a secured network received from a supplicant to an authentication server;
store an identifier provided by the supplicant in a memory implemented using a trusted platform module; and
in response to detection of the processor resuming operation from a failure event, transmit a second request for access to the secured network to the authentication server on behalf of the supplicant, the second request including the identifier provided by the supplicant stored in the memory.

13. The at least one tangible machine readable storage medium of claim 12, wherein the storing of the identifier is performed in response to a determination that the supplicant is to be granted access to the secured network.

14. The at least one tangible machine readable storage medium of claim 12, wherein the failure event is a power loss event.

15. The at least one tangible machine readable storage medium of claim 12, wherein the first request is an Extensible Authentication Protocol Response/Identify message.

16. The at least one tangible machine readable storage medium of claim 12, wherein the second request is a Remote Authentication Dial-In User Service Access Request message.

17. The at least one tangible machine readable storage medium of claim 12, wherein the instructions, when executed, further cause the processor to, in response to a third request received from the supplicant, remove the identifier from the memory.

18. The apparatus of claim 1, wherein the authentication controller communicates with the authentication server via the secured network, and the supplicant communicates with the authentication controller via an unsecured network different from the secured network.

19. The method of claim 6, wherein the first request is relayed via the secured network, and the request for access to the secured network is communicated by the supplicant via an unsecured network different from the secured network.

20. The at least one tangible machine readable storage medium of claim 12, wherein the first request is relayed via the secured network, and the request for access to the secured network is communicated by the supplicant via an unsecured network different from the secured network.

* * * * *